(12) United States Patent
Kazuno et al.

(10) Patent No.: US 10,175,747 B2
(45) Date of Patent: Jan. 8, 2019

(54) ENERGY MANAGEMENT SYSTEM CONFIGURED TO MANAGE OPERATION STATES OF LOAD APPARATUSES INSTALLED IN FACILITY

(71) Applicant: Panasonic Intellectual Property Management Co., Ltd., Osaka (JP)

(72) Inventors: Hiroki Kazuno, Osaka (JP); Yoshifumi Murakami, Osaka (JP); Takeshi Sugiyama, Hyogo (JP); Tomoya Sogo, Osaka (JP); Toshiaki Nakao, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 394 days.

(21) Appl. No.: 14/432,063

(22) PCT Filed: Sep. 13, 2013

(86) PCT No.: PCT/JP2013/005453
§ 371 (c)(1),
(2) Date: Aug. 11, 2015

(87) PCT Pub. No.: WO2014/057613
PCT Pub. Date: Apr. 17, 2014

(65) Prior Publication Data
US 2016/0004297 A1    Jan. 7, 2016

(30) Foreign Application Priority Data

Oct. 12, 2012    (JP) .................................. 2012-227252

(51) Int. Cl.
*G06F 1/32*    (2006.01)
*G06F 1/26*    (2006.01)
(Continued)

(52) U.S. Cl.
CPC .......... *G06F 1/3296* (2013.01); *G06F 1/3206* (2013.01); *G06Q 30/06* (2013.01);
(Continued)

(58) Field of Classification Search
CPC ............................. G06F 1/3206; G06F 1/3296
See application file for complete search history.

(56) References Cited

U.S. PATENT DOCUMENTS 9,633,320 B2 *    4/2017   Nagata et al. ......... G06Q 10/04
                                                            700/291
2003/0158631 A1    8/2003   Masuda et al.
(Continued)

FOREIGN PATENT DOCUMENTS

EP    2 808 686 A1    12/2014
JP    2001-327076 A    11/2001
(Continued)

OTHER PUBLICATIONS

International Search Report for corresponding International Application No. PCT/JP2013/005453 dated Nov. 26, 2013.
(Continued)

*Primary Examiner* — Nitin C Patel
(74) *Attorney, Agent, or Firm* — Renner, Otto, Boisselle & Sklar, LLP

(57) ABSTRACT

An energy management system configured to manage operation states of load apparatuses installed in facility includes an instruction unit (14), a target evaluation unit (16), a presentation control unit (17) and a user device (60). According to a target power-saving ratio in a facility where load apparatuses (30) are installed, the instruction unit (14) controls operations of the load apparatuses (30). The user device (60) has a function for displaying information. The target evaluation unit (16) evaluates consumption of utility energy by the load apparatuses (30) with respect to a
(Continued)

predetermined target value. The presentation control unit (17) controls so that the user device (60) displays an icon of which form varies according to an evaluation result by the target evaluation unit (16).

6 Claims, 3 Drawing Sheets

(51) Int. Cl.
*G06Q 30/06* (2012.01)
*G06Q 50/06* (2012.01)
*H02J 3/14* (2006.01)
*H02J 7/34* (2006.01)
*H02J 13/00* (2006.01)

(52) U.S. Cl.
CPC ............ *G06Q 50/06* (2013.01); *H02J 3/14* (2013.01); *H02J 7/34* (2013.01); *H02J 13/0079* (2013.01); *G05B 2219/2639* (2013.01); *H02J 2003/143* (2013.01); *Y02B 70/3225* (2013.01); *Y02B 70/3266* (2013.01); *Y04S 20/222* (2013.01); *Y04S 20/224* (2013.01); *Y04S 20/242* (2013.01); *Y04S 50/10* (2013.01)

(56) References Cited

U.S. PATENT DOCUMENTS

| | | | | |
|---|---|---|---|---|
| 2004/0220702 | A1* | 11/2004 | Matsubara et al. | G06F 1/3206 700/291 |
| 2005/0096797 | A1* | 5/2005 | Matsubara | H02J 3/00 700/291 |
| 2007/0203860 | A1* | 8/2007 | Golden | G06Q 10/04 705/412 |
| 2008/0224892 | A1* | 9/2008 | Bogolea | G01D 4/004 340/870.3 |
| 2009/0109056 | A1* | 4/2009 | Tamarkin | G01D 4/004 340/870.02 |
| 2009/0281886 | A1* | 11/2009 | Castelli | G01D 4/004 705/14.17 |
| 2009/0319905 | A1* | 12/2009 | Loeb | G06Q 10/06 715/736 |
| 2011/0077791 | A1 | 3/2011 | Yoshii et al. | |
| 2011/0165544 | A1 | 7/2011 | Itaya et al. | |
| 2011/0252261 | A1* | 10/2011 | Rhee | G01D 4/00 713/340 |

FOREIGN PATENT DOCUMENTS

| | | |
|---|---|---|
| JP | 2009-180741 A | 8/2009 |
| JP | 2009-240032 A | 10/2009 |
| JP | 2011-078226 A | 4/2011 |
| JP | 2011-187030 A | 9/2011 |
| JP | 2011-220647 A | 11/2011 |
| JP | 2012-068494 A | 4/2012 |
| JP | 4962813 B1 | 4/2012 |
| WO | WO 2010/029845 A1 | 3/2010 |

OTHER PUBLICATIONS

Form PCT/ISA/237 for corresponding International Application No. PCT/JP2013/005453 dated Nov. 26, 2013.

* cited by examiner

FIG. 2

| No | AREA | SCENE | OT | ACCBU | LCBU | CCBU | PT (AC) | PI | PT (CASE) |
|---|---|---|---|---|---|---|---|---|---|
| 1 | SELLING AREA | BUSY | 28 | 100 | 25 | 200 | 24 | 750 | 5 |
| 2 | SELLING AREA | NOT BUSY | 32 | 100 | 25 | 200 | 26 | 500 | 3 |
| 3 | SELLING AREA | BUSY | 30 | 150 | 20 | 250 | 26 | 550 | 5 |
| 4 | SELLING AREA | POWER SAVING | 30 | 150 | 20 | 250 | 30 | 500 | 6 |
| ⋮ | ⋮ | ⋮ | ⋮ | ⋮ | ⋮ | ⋮ | ⋮ | ⋮ | ⋮ |

FIG. 3

| ENVIRONMENTAL BENCHMARK | | CONTROL LEVEL0 | CONTROL LEVEL1 | CONTROL LEVEL2 | CONTROL LEVEL3 |
|---|---|---|---|---|---|
| ILLUMINATION | | ■SELLING AREA 1000lx | ■SELLING AREA 600lx | ■SELLING AREA 400lx | ■SELLING AREA 300lx |
| AIR CONDITIONING | | ■AIR CONDITIONING 24°C | ■COOLING 26°C<br>■HEATIG 22°C | ■COOLING 28°C<br>■HEATIG 18°C | ■COOLING OFF<br>■HEATIG OFF |
| CASE | | ■FREEZIG -30°C<br>■REFRIGERATING 3°C | ■FREEZIG -27°C<br>■REFRIGERATING 6.6°C | ■FREEZIG -27°C<br>■REFRIGERATING 6.6°C | ■FREEZIG -27°C<br>■REFRIGERATING 6.6°C |

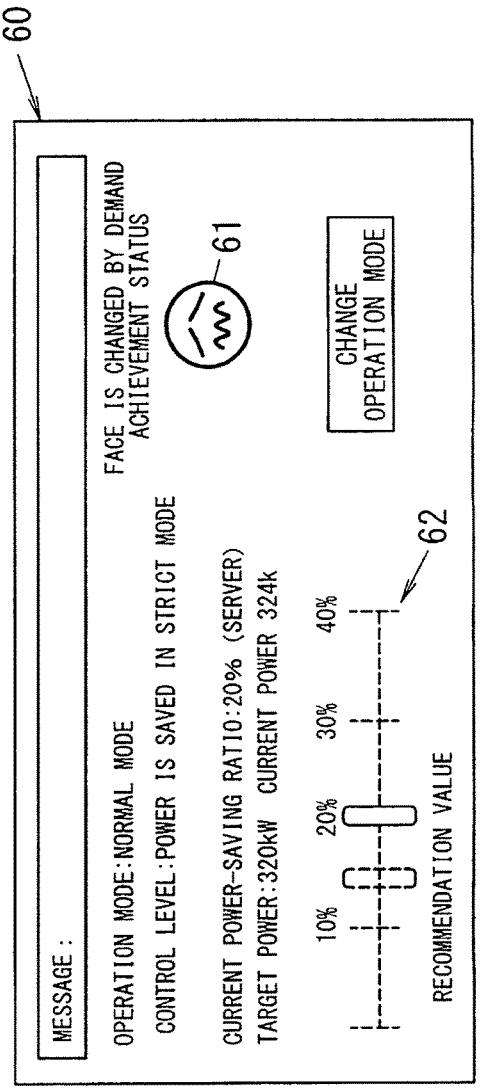

FIG. 4

ENERGY MANAGEMENT SYSTEM CONFIGURED TO MANAGE OPERATION STATES OF LOAD APPARATUSES INSTALLED IN FACILITY

TECHNICAL FIELD

The invention relates to an energy management system configured to manage operation states of load apparatuses installed in a facility and to suppress utility energy consumed by the load apparatuses.

BACKGROUND ART

For a facility including many load apparatuses, various technologies for suppressing utility energy consumed by load apparatuses have been proposed so far. For example, many load apparatuses such as lighting apparatuses, air conditioners and refrigerating apparatuses (refrigerators or freezers) are installed in a facility such as a supermarket dealing with food. In order to suppress utility energy consumed by such load apparatuses, an energy management system is provided and configured to control load apparatuses according to various conditions.

In general, a consumer of electricity makes an electricity supply contract with a power company. In a Japanese contract, contract demand is set to a largest value of maximum demand power for each month of a past year including a current month. Maximum demand power for a current month is obtained by measuring an integrated value (demand energy) of demand power (power consumption) per prescribed demand time limit (typically 30 minutes) to obtain demand power and by selecting maximum demand power from each demand power measured up to the current month.

For example, JP Pub. No. 2009-240032 accordingly discloses a demand control system. The system is configured to control respective power of lighting apparatuses so that the demand value (demand power) does not exceed a predetermined contract demand.

In a case where the integrated value of demand power (power consumption) is managed as stated above, if not having expert knowledge, a user cannot recognize whether or not an integrated value of power consumption changes suitably even if only the integrated value of power consumption is shown. If the management of power consumption is performed in accordance with a rule that is set to the energy management system, the user will believe that an integrated value of power consumption changes suitably.

In a case where a large change occurs in an external environmental condition (e.g., air temperature), there is a possibility that an operation that is not necessarily preferable for management of a facility is performed by load control because the energy management system performs a uniform control. For example, in a facility in which flat showcases are installed as refrigerating apparatuses, it is necessary to secure power for the showcases because each temperature inside the showcases requires to be maintained. That is, when the handling by the energy management system is difficult, users themselves require judging management for the case. However, if they have no expert knowledge, they cannot perform necessary management.

SUMMARY OF INVENTION

It is an object of the present invention to provide an energy management system that enables a user without having expert knowledge to manage a target value for consumption of utility energy.

An energy management system of the present invention includes an instruction unit (13), a user device (60), a target evaluation unit (16) and a presentation control unit (17). The instruction unit (13) is configured to control operations of load apparatuses (30) in accordance with a target power-saving ratio in a facility where the load apparatuses (30) are installed. The user device (60) has a function configured to display information. The target evaluation unit (16) is configured to evaluate consumption of utility energy by the load apparatuses (30) with respect to a predetermined target value. The presentation control unit (17) is configured to control so that the user device (60) displays an icon of which form varies according to an evaluation result by the target evaluation unit (16).

In an embodiment, the target evaluation unit (16) is configured, based on the target value that is set at an end point of a prescribed judgement period, to set regions for determination of a transition in the consumption during the judgement period. The presentation control unit (17) is configured to vary the form of the icon according to a region to which the consumption belongs.

In an embodiment, the target evaluation unit (16) has a function configured to determine a ratio of the consumption to the target value. The presentation control unit (17) is configured, if the ratio determined by the target evaluation unit (16) exceeds a specified threshold, to control so that the user device displays a message for causing part of the load apparatuses (30) to be stopped.

In an embodiment, the target evaluation unit (16) is configured to set, to a recommendation value, minimum consumption of utility energy by which management of the facility is not influenced. The presentation control unit (17) is configured, when the target value is set to be lower than the recommendation value, to control so that the user device displays a message representing that the target value is unattainable.

In an embodiment, the energy management system further comprises an information storage unit (22) and an energy calculation unit (26). The information storage unit (22) is configured to store capacity basic units obtained by dividing consumption of utility energy of load apparatuses (30) obtained from each of facilities by a floor area of a corresponding facility. The energy calculation unit (26) is configured to calculate the recommendation value of the facility by energy simulation. The energy calculation unit (26) is configured to multiply the floor area of the facility of the recommendation value to be calculated by the capacity basic unit stored in the information storage unit (22) and thereby to calculate the consumption of utility energy by the load apparatuses (30) in the facility of the recommendation value to be calculated.

In an embodiment, the information storage unit (22) is configured to store information on weather information including an outdoor temperature and a region in which the facility exists, which are related to each other. The energy calculation unit (26) is configured to set, as predictor variables, a daily maximum temperature of an outdoor temperature extracted from the information storage unit (22) according to a region of the facility of the recommendation value to be calculated and the capacity basic unit extracted from the information storage unit (22) with respect to the load apparatuses (30) in the facility, and to calculate a maximum value as the recommendation value by using a regression equation for calculating a daily maximum value of consumption of utility energy.

In the configuration of the invention, a content is presented to a user in response to a degree of an attainable estimation of the target value by the utility energy. Accordingly, even if not having expert knowledge, the user can manage the target value for consumption of utility energy.

BRIEF DESCRIPTION OF DRAWINGS

Preferred embodiments of the invention will now be described in further details. Other features and advantages of the present invention will become better understood with regard to the following detailed description and accompanying drawings where:

FIG. 2 illustrates an information set stored in an information storage unit used in the embodiment;

FIG. 3 illustrates a control table used in the embodiment; and

FIG. 4 illustrates a screen of a user device used in the embodiment.

DESCRIPTION OF EMBODIMENTS (Overall Configuration)

Figure 1:
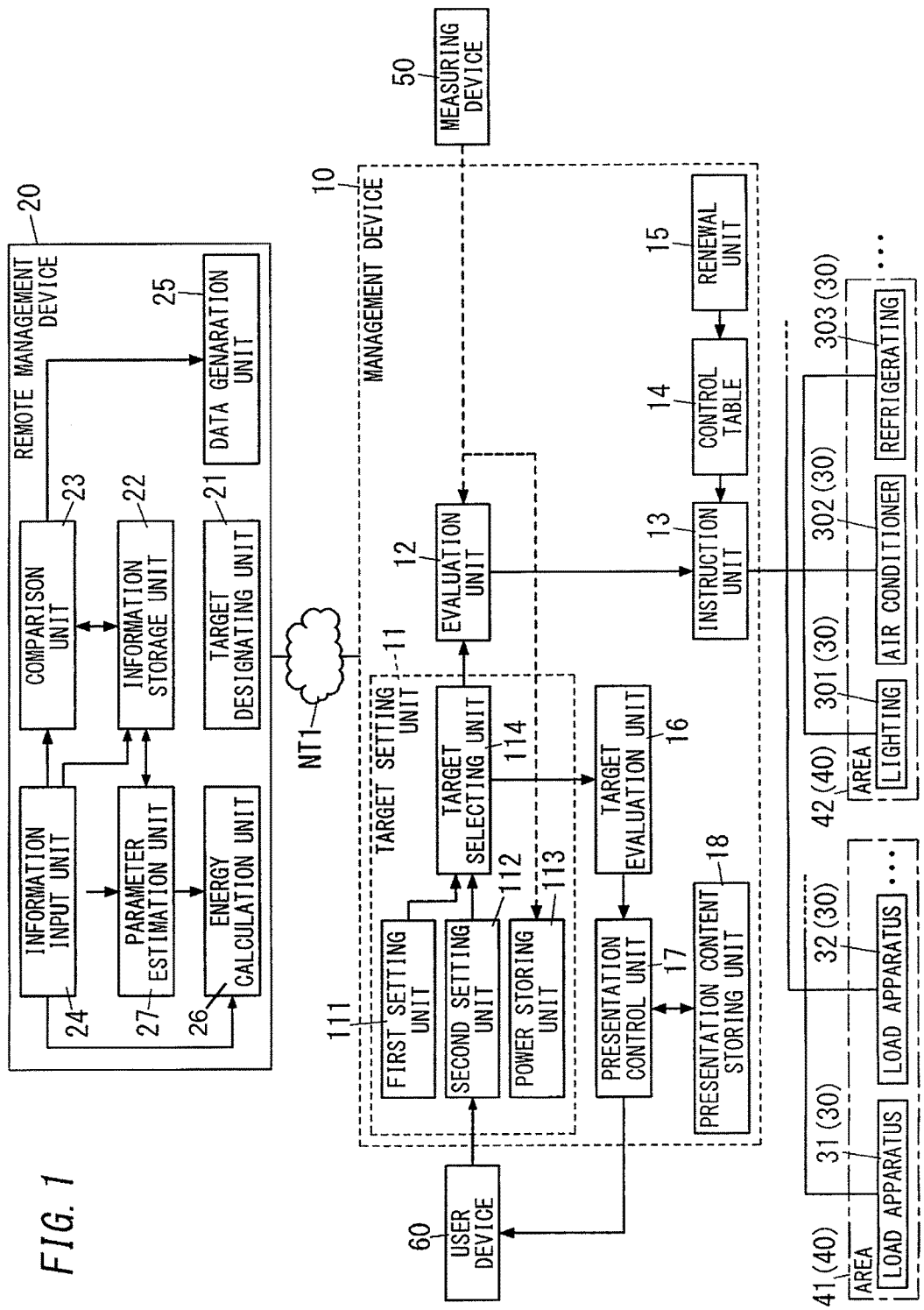
FIG. 1 is a block diagram of an embodiment of the present invention.

As shown in FIG. 1, an embodiment (an energy management system) explained below includes a management device 10. A facility including the management device 10 is provided with load apparatuses 30, a measuring device 50 and a user device 60. In an example of FIG. 1, the energy management system further includes a remote management device 20.

The management device 10 is configured to manage electricity consumed (hereinafter referred to as "electricity consumption") by the load apparatuses 30 (31, 32, . . . ) installed in the facility. In first and second examples, the management device 10 is configured to manage power consumption and energy consumption by the load apparatuses 30 installed in the facility, respectively. That is, in the first example, the management device 10 is configured to manage power consumption by the load apparatuses 30 installed in the facility. In the second example, the management device 10 is configured to manage energy consumption by the load apparatuses 30 installed in the facility. The first and second examples correspond to first and second examples to be described later, respectively. An embodiment may include all or part of the first examples. Another embodiment may include all or part of the second examples.

The facility may be a building space such as a supermarket dealing with food, a convenience store, a department store, a shop building, an office building, a hotel or a hospital, as well as a park, a theme park or the like. These are examples of the facility. There is no restriction on forms thereof but it is desirable that the facility be a space where load apparatuses are installed and electricity consumption by the installed load apparatuses is managed in a lump by a consumer. The facility is divided into two or more areas 40 (41, 42, . . . ), and load apparatuses 31, 32, . . . are installed in the two or more areas 41, 42, . . . .

In the following embodiment, it is assumed that the load apparatuses 30 be electric loads. However, they may include appliances such as gas appliances and appliances utilizing water. Hereinafter, the load apparatuses 30 and the like are also referred to as measurement objects. Electricity supplied from an electric public utility, gas supplied from a gas public utility, water supplied from a water public utility or the like is referred to as "utility energy".

The measuring device 50 is configured to measure utility energy by measurement objects per unit time. In the embodiment, the measuring device 50 is configured to measure electricity consumption. In the first example, the measuring device 50 is configured to measure power consumption by measurement objects per unit time. In this example, the measuring device 50 may be configured to measure instantaneous power consumption per unit time, or may be configured to measure average power consumption for unit time. In the second example, the measuring device 50 is configured to measure an integrated value of power consumption (energy consumption) by measurement objects for unit time. Hereinafter, power consumption or energy consumption measured with the measuring device 50 is also referred to as a "measured value". It is desirable that the measuring device 50 include a function configured to obtain a measured value from the measurement objects in a whole of the facility, as well as, for example, a function configured to obtain a measured value from measurement objects in each of the areas 40, a function configured to obtain a measured value for each of kinds of the load apparatuses 30, and a function configured to obtain a measured value from each element (load apparatus 30) of the measurement objects (the load apparatuses 31, 32, . . . ).

The facility is explained as the supermarket dealing with food in the embodiment explained below. The supermarket assumed in the embodiment includes, but not limited to, two or more areas 40 such as a selling area(s), a counter(s), a backyard(s) and an office room(s). Lighting apparatuses 301, air conditioners 302 and refrigerating apparatuses 303 are installed in the selling area(s) and the backyard(s). Lighting apparatuses 301 and air conditioners 302 are installed in the counter(s) and the office room(s). Refrigerating apparatus 303 means a refrigerator and a freezer, for preserving and displaying food. Showcases of various types such as flat type, multistage type and reach-in type as refrigerating apparatuses 303 are installed in the selling area(s). Refrigerators having large capacity as the refrigerating apparatus 303 are installed in the backyard(s).

(Management Device)

The management device 10 includes a connection unit (not shown) configured to be connected with any other apparatus(es) (hereinafter referred to as a "target device(s)"). The management device 10 is configured to transmit information between itself and the target device(s) and to monitor and control an operation(s) of the target device(s), through the connection unit. The connection unit includes a device such as a terminal or a connector, configured to be electrically connected with the target device(s), and a device for sending and receiving a signal(s), or a device for opening and closing an electric circuit(s). The management device 10 includes, as a main hardware element, a computer for realizing functions explained below by executing a program(s). Examples of the computer include: a processor and a memory each of which is a discrete device; and a microcomputer of one chip type, including a processor and a memory.

The present embodiment includes target devices to be connected with the connection unit of the management device 10, such as the remote management device 20, the load apparatuses 30, the measuring device 50 and the user device 60, but other devices can be connected therewith.

The remote management device 20 is a computer server that includes one or more computers and is configured to execute a program(s) for configuring functions explained below. The connection unit of the management device 10 therefore includes an unillustrated interface (hereinafter referred to as an "I/F") for communicating with the remote management device 20 through a communication network NT1. The remote management device 20 may include two or more computers which are associated with each other so that they can communicate with each other. In an example, a VPN (Virtual Private Network) formed of a public network such as internet is used for the communication network NT1.

Each load apparatus 30 in the embodiment includes a function configured to communicate with the management device 10, a function configured to operate in accordance with an instruction, for controlling an operation state of the load apparatus 30, from the management device 10, and a function configured to notify the management device 10 of the operation state. The connection unit of the management device 10 therefore includes an I/F (not shown) for communicating with the load apparatuses 30. A load apparatus(es) 30 may be however configured to receive only ON and OFF control by a communication signal from the management device 10. In addition, a load apparatus(es) 30 with no function configured to communicate with the management device 10 may be employed. In this case, the management device 10 requires including a switch element such as a relay configured to open and close an electric circuit for supplying power to the load apparatus(es) 30.

The measuring device 50 is configured to transmit the measured value to the management device 10. In the first and second examples, the measuring device 50 is configured to transmit information on measured electric power and electric energy to the management device 10, respectively. The connection unit of the management device 10 includes an I/F (not shown) for communicating with the measuring device 50. A transmission path used for communication between the management device 10 and the measuring device 50 may be either a wired communication path or a wireless communication path. It is however desirable that the wired communication path be employed in case the management device 10 is installed near a distribution panel because of a short distance from the measuring device 50, and the wireless communication path be employed in case the management device 10 is installed apart from the distribution panel. The I/F (not shown) is configured to obtain a measured value from the measuring device 50 per unit time. In the first and second examples, the I/F is configured to obtain information on electric power and electric energy from the measuring device 50 per unit time, respectively. In the embodiment, the unit time is selected from one minute, five minutes and the like, for example.

The user device 60 includes a display unit and an operation unit as user interfaces, and has a function configured to display the information obtained by the management device 10 on the display unit for visualization, and a function configured to control an operation of the management device 10 in response to an operation through the operation unit by a user such as a person responsible for the facility. It is desirable that the display unit and the operation unit include an operation display device having a configuration where a touch panel is overlaid with a screen of a flat panel display. The user device 60 may be not only a dedicated device but also a device such as a computer, a smart phone or a tablet terminator. The connection unit of the management device 10 includes an I/F (not shown) configured to utilize such a user device 60. Thus, in a case where the computer, the smart phone, the tablet terminator or the like is employed as the user device 60, a protocol of a wireless LAN (Local Area Network) or a Bluetooth (trademark) is employed.

The management device 10 includes a target setting unit 11, an evaluation unit 12, an instruction unit 13 and the like.

The target setting unit 11 is configured so that a target value of electricity consumption is set thereto. The evaluation unit 12 is configured to compare the measured value obtained from the measuring device 50 with the target value that is set to the target setting unit 11. The instruction unit 13 is configured to instruct operations of the load apparatuses 30 in accordance with an evaluation result by the evaluation unit 12. In the first and second examples, the target setting unit 11 is configured so that a target value of power consumption and a target value of energy consumption is installed therein, respectively. Hereinafter, the target value of power consumption and the target value of energy consumption are referred to as "target power" and "target energy", respectively.

The target setting unit 11 is configured, if receiving a power-saving ratio, to multiply a preset reference value by the power-saving ratio to obtain the target value. The power-saving ratio is used to obtain the target value from the reference value. That is, the power-saving ratio is a ratio of a target ratio to the reference value. In the first and second examples, the target setting unit 11 is configured, if receiving a power-saving ratio, to multiply preset reference power and reference energy by the power-saving ratio to obtain the target power and the target energy, respectively. The reference power (or the reference energy) is defined by contract demand based on a contract with an electric public utility or the like, or is obtained from actual results of power consumption (or energy consumption) in the facility. In Japan, the contract demand is determined from annual maximum demand power, and accordingly the reference energy can be obtained from the contract demand. For example, in a case where annual maximum demand power is obtained from an average value of annual maximum demand energy, maximum demand energy can be obtained by multiplying the annual maximum demand power by a demand time limit.

Thus, the target value (target power or target energy) that is set to the target setting unit 11 is determined so that electricity consumption (power consumption or energy consumption) in the facility is reduced. A normal target value is determined in response to usefulness for persons existing in areas 40 so as not to spoil convenience which the persons existing in the areas 40 enjoy by operating load apparatuses 30 of the areas 40. A target value in an emergency when a power-saving ratio is given from the electric public utility is determined in accordance with the power-saving ratio.

Target values (target power or target energy) differ among facilities, and accordingly each of them is obtained from past result of electricity consumption (power consumption or energy consumption) and the power-saving ratio during a necessary power-saving period. The power-saving period is a period of time during which power is saved, and is selected from a daily time span, a period of time specified by the date and time, a period of time of two or more days, a day of the week, year and the like. For example, if the power-saving period is a time span having a peak demand for electricity (electric power or electric energy) a day, a period of time having a peak demand for electricity (electric power or electric energy) a year, and the like, a peak of electricity consumption (power consumption or energy consumption) can be suppressed. As a result, the electric public utility can suppress a peak of supply electricity. There is also a case where the target value (target power or target energy) is set so as to reduce annual electricity consumption (power consumption or energy consumption) in the facility.

The target value of the target setting unit 11 is set mainly by the remote management device 20, but is allowed to be set through the user device 60 by a user. Technology that the remote management device 20 sets the target value (target power or target energy) is explained later. In a case where the target value is set through the user device 60, the target value can be not only set as a target value for the whole facility but also set as a target value for each of the load apparatuses 30 or for each of the areas 40.

The target setting unit 11 includes a first setting unit 111 configured to store a first target value that is set by the remote management device 20, and a second setting unit 112 configured to store a second target value that is set by the user device 60. In the first and second examples, the first setting unit 111 is configured to store a first target power and a first target energy, set by the remote management device 20, respectively. In the first and second examples, the second setting unit 112 is configured to store a second target power and a second target energy, set through the user device 60, respectively. The first and second setting units 111 and 112 are configured to also store a power-saving period during which a corresponding target value be attained. Each of the first and second setting units 111 and 112 is formed of a storage device such as a semiconductor memory or a hard disk device.

The target setting unit 11 may include a measured value storing unit 113 configured to store a change in the measured value for a prescribed period in the facility. In the first and second examples, the measured value storing unit (hereinafter also referred to as a "power storing unit") 113 is configured to store a change in power consumption and energy consumption for the prescribed period in the facility. It is desirable that the power storing unit 113 store transition in actual measured values (power consumption or energy consumption) in the facility. There is however no actual result to be stored in the power storing unit 113 just after the management device 10 starts operating, or the like. The power storing unit 113 may therefore store transition of power consumption or energy consumption obtained from a facility that has the same size as that of the facility in which the management device 10 is installed. Such information on any other facility (facilities) may be obtained from the remote management device 20.

In a case where the power storing unit 113 is provided, the target setting unit 11 is configured to extract a measured value for a period of time corresponding to the power-saving period from the power storing unit 113 to calculate the first and second target values based on the received power-saving ratio. In the first example, the target setting unit 11 is configured to extract power consumption for the period of time corresponding to the power-saving period from the power storing unit 113 to calculate first target power and second target power based on the received power-saving ratio. In the second example, the target setting unit 11 is configured to extract energy consumption for the period of time corresponding to the power-saving period from the power storing unit 113 to calculate first target energy and second target energy based on the received power-saving ratio.

The first target value that is set by the remote management device 20 may be set by a request from the electric public utility such as power company. In this case, it may have emergency such that the power-saving period during which processing be performed is the day or the next day. On the other hand, in case of the second target value that is set through the user device 60, the power-saving period during which processing be performed is frequently comparatively long. Accordingly, a power-saving period is individually set in a case of the first target value, and an applicable period that is a comparatively long period of time is set in a case of the second target value. Daily time span for the applicable period is employed as a power-saving period. In other words, the power-saving period of the first setting unit 111 is individually set, and the power-saving period of the second setting unit 112 is specified by a combination of the applicable period and a time span. Thus, if the power-saving period that is set through the user device 60 is the combination of the applicable period and the time span, inconvenience such as frequent operations through the user device 60 can be prevented.

The target setting unit 11 includes a target selecting unit 114 in order to determine whether to select the first target value or the second target value. The target selecting unit 114 is configured to select any one of the first and second target values in accordance with an instruction from any of the remote management device 20 and the user device 60. In the first example, the target selecting unit 114 is configured to select any one of first target power and second target power in accordance with an instruction from any of the remote management device 20 and the user device 60. In the second example, the target selecting unit 114 is configured to select any one of first target energy and second target energy in accordance with an instruction from any of the remote management device 20 and the user device 60.

The management device 10 is configured to perform selection of two or more kinds of operation modes, and the target selecting unit 114 is configured to select any one of the first and second target values in accordance with an operation mode. Examples of the operation modes include a normal mode, a remote preceded mode and a user preceded mode. The operation mode selection is performed by the remote management device 20 or the user device 60.

The user preceded mode is an operation mode for prohibiting using the first target value through the user device 60, and provided for a case where a serious problem occurs in the facility if the first target value that is set by the remote management device 20 is used. That is, even if the remote management device 20 sets the first target value (or the power-saving ratio) without considering actual environmental condition of the facility, the first target value is prohibited from being used. A user can therefore operate the load apparatuses 30 in response to an environmental condition in an actual spot.

Examples of the serious problem in the management of a food supermarket includes a case where temperatures of the refrigerating apparatuses 303 become high for a long time, and the like. Therefore, in a configuration where the user preceded mode becomes active when the temperatures of the refrigerating apparatuses 303 are higher than a prescribed value, deterioration in the quality of food owing to an increase in temperature of the refrigerating apparatuses 303 can be prevented while preventing abuse of the user preceded mode.

The target selecting unit 114 is configured, in the normal mode, to select a target value having a larger power-saving ratio, of the first and second target values. Therefore, the electricity consumption can satisfy both the first and second target values if the normal mode is selected.

The evaluation unit 12 is configured to obtain electricity consumption for an elapse time from a start of a judgment period based on electricity consumption measured per unit time by the measuring device 50 from the start of the judgment period, and to estimate transition, for the judgment period, of the obtained electricity consumption based on a ratio of the obtained electricity consumption to the target value as well as the elapse time. The evaluation unit 12 is also configured to judge whether or not the estimated transition exceeds the target value for the judgment period. In the first example, the evaluation unit 12 is configured to obtain average power consumption for an elapse time from a start of a judgment period by integrating power consumption measured per unit time by the measuring device 50 from the start of the judgment period, and to estimate transition, for the judgment period, of the average power consumption for the elapse time based on a ratio of the average power consumption (an average value of the integrated value) to the target power as well as the elapse time. In the first example, when the measuring device 50 is configured to measure instantaneous power consumption per unit time, it is desirably configured to measure instantaneous power consumption per unit time that is comparatively short in order to obtain relatively high-precision average power consumption. On the other hand, when the measuring device 50 is configured to measure average power consumption during unit time, precision of average power consumption for the elapse time can be prevented from being influenced by the unit time used by the measuring device 50. In the second example, the evaluation unit 12 is configured to obtain energy consumption for an elapse time from a start of a judgment period by integrating energy consumption measured per unit time by the measuring device 50 from the start of the judgment period, and to estimate transition, for the judgment period, of the energy consumption for the elapse time based on a ratio of the obtained energy consumption to the target energy as well as the elapse time.

The instruction unit 13 is configured, if the evaluation unit 12 judges that the estimated transition will exceed the target value for the judgment period, to give an instruction to the load apparatuses 30 so that the load apparatuses 30 perform operations for suppressing electricity consumption. In the first example, the instruction unit 13 is configured, if the evaluation unit 12 estimates that transition of the estimated average power consumption will exceed the target power, to instruct the load apparatuses 30 to perform operations for suppressing power consumption by the load apparatuses 30. In the second example, the instruction unit 13 is configured, if the evaluation unit 12 estimates that transition of the estimated energy consumption will exceed the target energy, to instruct the load apparatuses 30 to perform operations for suppressing energy consumption by the load apparatuses 30. A degree (hereinafter referred to as a "control level") for suppressing power consumption (or energy consumption) depends on a rate of power consumption (energy consumption) and target power (target energy). The evaluation unit 12 is therefore configured to notify the instruction unit 13 of the control level in response to a relation between the estimated transition and the target value. The control level can be selected from two or more (four steps in the explanation below) steps.

Incidentally, the judgment period is selected from, for example, 30 minutes, one day, one month, one year and the like. For example, in a case where a rate structure to be applied is defined by a unit price of electricity charges based on a monthly maximum value obtained from electricity consumption (power consumption or energy consumption) per 30 minutes, 30 minutes is selected as the judgment period. In a case where a power-saving ratio of monthly or annual electricity consumption (power consumption or energy consumption) is set as the target value, the judgment period is one month or one year. The electricity consumption (power consumption or energy consumption) is integrated from a start of the judgment period, and is reset to zero at an end point of the judgment period.

The instruction unit 13 is configured, if the control level is notified from the evaluation unit 12, to select load apparatuses 30, of which electricity consumption be reduced, and to determine operations of the selected load apparatuses 30, so that electricity consumption (power consumption or energy consumption) in the facility is reduced in accordance with the control level. Respective control levels are related to kinds and operations of load apparatuses 30. Kinds and operations of load apparatuses 30 can be varied according to time passage.

Relations between control levels and combinations each of which includes kinds and operations of load apparatuses 30 are stored in a control table 14. In an example, the control table 14 may store control procedures of load apparatuses 30 so that at least one of kinds and operations of load apparatuses 30 as control targets are varied according to time passage. For example, the instruction unit 13 may be configured, if a control level is notified from the evaluation unit 12, to refer to contents of the control table 14 to give instructions to load apparatuses 30 in accordance with kinds and operations of the load apparatuses 30 read out from the control table 14. In this case, the control table 14 includes predetermined control levels to be obtained from the evaluation unit 12, and kinds and operations of load apparatuses 30 related to each of the control levels.

In another example, the control table 14 may include predetermined control levels to be obtained from the evaluation unit 12, and orders per the kinds and operations of load apparatuses 30 related to each of the control levels. For example, the orders are set to limit electricity (power or energy). For example, in a food supermarket, management of the supermarket is hardly influenced even if electricity consumption (power consumption or energy consumption) of lighting apparatuses 301 and an air conditioner(s) 302 in an office room(s) is reduced. It is however difficult to reduce electricity consumption of refrigerating apparatuses 303. Therefore, the contents of the control table 14 define an operation for reducing electricity consumption of targets of lighting apparatuses 301 and an air conditioner(s) 302 in an office room(s) with respect to a control level by which electricity consumption is reduced at a low ratio. In other words, the contents of the control table defines each control level related to kinds and operations of load apparatuses 30 in order of fewer influence in case of reduction in electricity consumption.

The contents of the control table 14 are rewritable, and information containing a content of the control table 14 is transmitted from the remote management device 20. A renewal unit 15 provided in the management device 10 is configured to receive the information containing the content of the control table 14 transmitted from the remote management device 20 and to renew the contents of the control table 14 in accordance with the information transmitted from the remote management device 20. However, the contents of the control table 14 may be set with the user device 60.

Too strict target value (or power-saving ratio) for management of a target facility may be set. Such a problem easily occurs in case of the first target value in particular because it is unilaterally set by the remote management device 20 without considering actual environmental condition as stated above. There is also a possibility that a problem occurs in management of the facility if the second target value that is set with the user device 60 is set to be too small.

Accordingly, in order to prevent a target value (a power-saving ratio) from being set to be too small (large), the management device 10 includes a target evaluation unit 16 configured to evaluate a target value (target power or target energy) that is set to the target setting unit 11. The target evaluation unit 16 is configured, based on a recommendation value (recommendation power or recommendation energy) that is electricity consumption (power consumption or energy consumption) as a minimum limit for managing the facility without problems, to compare the target value that is set to the target setting unit 11 with the recommendation value. In a case where a target value that is set to the target setting unit 11 is smaller than the recommendation value, the target evaluation unit 16 is configured to call user's attention through the user device 60. The recommendation value is mainly provided from the remote management device 20, but may be provided through the user device 60.

A recommendation value (recommendation power or recommendation energy) estimated per facility is obtained from a past actual value(s) or a simulation result(s) of electricity consumption (power consumption or energy consumption) in the facility. The remote management device 20 includes a function for estimating an environmental condition for management of the facility without problems, and a function for simulation of electricity consumption, as described below.

Technology of calling user's attention through the user device 60 is selected from technology of displaying comment sentence on the display unit of the user device 60, technology of changing a background color of the display unit to red or the like, technology of emitting a beep sound, or the like. The management device 10 includes a presentation control unit 17 configured to display information on the display unit of the user device 60, and a presentation content storing unit 18 configured to store presentation contents to be displayed on the display unit. The presentation content storing unit 18 is configured to store an information set to be displayed through the user device 60, such as a comparison result by the evaluation unit 12 between a measured value (electric power or electric energy) obtained from the measuring device 50 and a target value that is set to the target setting unit 11, and an evaluation result by the target evaluation unit 16. The presentation control unit 17 includes a function configured to provide information stored in the presentation content storing unit 18 for the user device 60. The presentation control unit 17 is configured to also display contents, indicated from the instruction unit 13 to load apparatuses 30, through the user device 60.

As stated above, the instruction unit 13 is configured, if a control level is transmitted from the evaluation unit 12 to the instruction unit 13, to check the control level with the control table 14 to extract kinds and operations of the load apparatuses 30 according to the control level. In the embodiment, in a case where even if the control level is increased and electricity consumption (power consumption or energy consumption) by the load apparatuses 30 is reduced, it is higher than a target value (target power or target energy), the instruction unit 13 is configured to judge that more power-saving is impossible in view of management of the facility to provide the judgement result for the user device 60 through the presentation control unit 17. The management device 10 may be configured to change the operation mode to the user preceded mode based on the judgement result by the instruction unit 13. In the user preceded mode, an operation by the user device 60 allows prohibition of power-saving or an increase in power consumption by the load apparatuses 30. That is, a user is to perform power-saving with consent because electricity consumption can be increased in accordance with actual environmental condition of the facility space while accepting the first target value (or power-saving ratio) indicated by the remote management device 20.

(Remote Management Device)

The remote management device 20 is configured to communicate with two or more management devices 10. In order to notify respective management devices 10 of an identical first power-saving ratio, the remote management device includes a target designating unit 21 configured to hold a power-saving ratio as a target to be set, and a communication interface (not shown) configured to communicate with the management devices 10 through the communication network NT1. The target designating unit 21 receives, from an information input unit 24, the first power-saving ratio as well as a power-saving period of the day or the next day defined by the electric public utility or the like, which are transmitted to the management devices 10 at appropriate timing.

In the configuration, the remote management device 20 that is a headquarter and manages stores can transmit the first power-saving ratio to be set to each management device 10 of the stores in a business condition that the headquarter manages a number of stores, such as convenience stores and food supermarkets. Even in a case where power-saving for a particular date and time (time span) such as the day and the next day is requested from an electric public utility or the like, a requested first power-saving ratio can be transmitted to each management device 10 of the stores.

In order to control so that a management device 10 operates load apparatuses 30 so as to satisfy the first power-saving ratio, operations of the load apparatuses 30 require to be determined in response to an environmental condition of the facility in which the management device 10 is installed. In other words, it is necessary to adequately set relations between control levels and combinations, each of which includes kinds and operations of load apparatuses 30, to be registered on the control table 14.

On the other hand, the remote management device 20 is configured to communicate with two or more management devices 10. A history of electricity consumption (power consumption or energy consumption) can be collected per management device 10. In a case where there are existed two or more management devices 10 and a remote management device 20 that are communication objects as a first group as well as two or more management devices 10 and a remote management device 20 as a second group, the remote management device 20 of the first group may collect a history of electricity consumption per management device 10 of the second group from the remote management device 20 of the second group.

Thus, data on a history of electricity consumption collected from each of two or more facilities (management devices 10) are related to facility information on characteristics of a corresponding facility and stored in an information storage unit 22 provided in the remote management device 20. That is, the remote management device 20 relates data on the history of electricity consumption from each of the facilities to the characteristics of the corresponding facility and stores, in the information storage unit 22, a data set that is a collection of data each of which includes characteristic data of a facility and data on a history of electricity consumption related to the facility. The remote management device 20 receives facility information and setting information on characteristics of facilities through the management devices 10 from the user devices 60, and thereby characteristic data as information to be stored in the information storage unit 22 are obtained. The facility information and setting information to be stored in the information storage unit 22 can be input to the information storage unit 22 from the information input unit 24 provided in the remote management device 20.

When obtaining characteristic data (facility information) of each facility from the management devices 10, the remote management device 20 is configured to obtain each facility information along with a history of electricity consumption (power consumption or energy consumption) of a corresponding facility. Each facility information includes environmental information and setting information, and the environmental information includes equipment information, scene information and external environmental information.

The equipment information includes: information on a region where the facility exists, and use of the facility; information on size of the facility; and information on kinds and power capacity of the installed load apparatuses 30. The information on use includes divisions such as store, office building and hotel; and divisions of areas 40 such as selling area and office. Information on size is represented by a floor area of each area 40. Information on kinds of load apparatuses 30 represents kinds of lighting apparatus 301, air conditioner 302 and refrigerating apparatus 303. Information on power capacity (power range, especially maximum rated power [W]) is divided by the floor area [$m^2$] of a corresponding area 40, and the information storage unit 22 stores power load density per unit area (hereinafter referred to as a "capacity basic unit"). A floor area of each area 40 may be replaced with a volume, but the floor area is used in the explanation below.

The power load density is information representing remaining power for facility grade and saving energy. For example, an area 40 where lighting apparatuses 301 have large power load density shows a tendency to have high illuminance, and can have large remaining power for saving energy in comparison with an area 40 having low illuminance. Air conditioners 302 and refrigerating apparatus 303 are also similar. In food supermarkets, a design value of power load density of air conditioners 302 is about 110 W/$m^2$ in general. Power load density of 200 W/$m^2$ therefore has large remaining power for saving energy. Facility grades mainly represent heat insulating performance of areas 40.

The scene information represents environmental information that influences operations of the load apparatuses 30 such as busy time span, off time span, non-operating time span and power saving time span. That is, it represents environmental differences by the number, attributes (distinctions such as employees and visitors) of persons existing in the facility.

The external environmental information represents information on outdoor temperature, humidity, quantity of solar radiation and the like.

The setting information is environmental information obtained from operations of load apparatuses 30. In the embodiment, the setting information represents illuminance that is set for a lighting apparatus(es) 301, a temperature that is set for an air conditioner(s) 302, a temperature that is set for a refrigerating apparatus(es) 303.

The remote management device 20 is configured to produce contents of the control table 14 provided in the management device 10 based on a data set stored in the information storage unit 22. Accordingly, the remote management device includes a comparison unit 23 configured to compare facility information corresponding to the management device 10 and facility information stored in the information storage unit 22 to evaluate similarity therebetween based on predetermined evaluation rule. The characteristics of the facility in which load apparatuses 30 that are managed by the management device 10 are installed is given to the comparison unit 23 from the information input unit 24. The information input unit 24 may be configured to enter characteristics of the facility through an operation unit such as a keyboard and a mouse, or configured to receive the characteristics of the facility from the user device 60 provided in the management device 10. A function of the information input unit 24 will be described later.

The comparison unit 23 is configured to extract setting information by using, as a key, environmental information of the characteristics of the facility provided from the information input unit 24. When the environmental information used as the key is represented by characters, a record including information that agrees on the key is extracted. When the environmental information used as the key is represented by a numerical value such as power load density or outdoor temperature, similarity is evaluated for each of the kinds of the load apparatuses 30 in accordance with the predetermined evaluation rule, and setting information having higher similarity is selected for each of the kinds of the load apparatuses 30. The process will be explained later. It is desirable that the environmental information used as the key include at least a classification of the facility, a classification of the area 40, power load density, scene information and outdoor temperature.

When the comparison unit 23 extracts a collection of setting information on characteristics of facilities from the data set stored in the information storage unit 22, it may transmit the collection of setting information to the management device 10 to allow a user to select desired setting information from the collection of setting information on the characteristics of the facilities by presentation through the user device 60.

When the comparison unit 23 cannot extract, from the information storage unit 22, data that agree on the key provided from the information input unit 24, the comparison unit is configured to notify the management device 10 to request user's intervention through the user device 60. In this case, it is desirable that the user device 60 show the key used to extract the data to allow the user to exclude part of the key.

When the setting information can be extracted from the data set stored in the information storage unit 22, setting information which an expert or a specialist has set can be used for a facility having similar environmental information. Accordingly, even if not having special knowledge, a user can easily set appropriate setting information by only communication between the management device 10 and the remote management device 20. Contents of the control table 14 can be determined for a short time based on setting information that is suitable for the facility where load apparatuses 30 managed by the management device 10 are installed. The remote management device 20 includes a data generation unit 25 configured to generate control data, which are a content of the control table 14, based on the data extracted by the comparison unit 23. As stated above, the control table 14 includes control levels and respective operations of load apparatuses 30, related to the control levels.

Even if every information collected from the management device 10 is stored as setting contents per facility in the information storage unit 22, the collected information may include information which neither expert nor specialist has set. On the other hand, there is a possibility that control information obtained as a result desirable for the facility is included even when it is not control information which an expert or a specialist has set. The information storage unit 22 may be accordingly configured, when control data selected by the management device 10 are maintained for predetermined duration time (e.g., one hour), to judge that the operations of the load apparatuses 30 are desirable for a user and store the data. That is, the information storage unit 22 may be configured to store control information of the load apparatuses 30 judged as desirable operations for the user, along with facility information. Thus, information stored in the information storage unit 22 is a successful case, and can be used for other facility.

The remote management device 20 includes a function configured to calculate reference power in addition to a function configured to notify the management device 10 of the first power-saving ratio obtained from the aforementioned electric public utility or the like, and a function configured to determine contents of the control table 14 provided in the management device 10. That is, the remote management device 20 includes an energy calculation unit 26 configured to determine the reference power and recommendation power to be given to the target evaluation unit 16 of the management device 10.

The energy calculation unit 26 is configured to estimate power consumption of the facility by computer simulation based on information similar to the aforementioned characteristics of the facility. That is, the energy calculation unit 26 is formed of a computer executing an application program for energy simulation. Examples of the application program for energy simulation include TRNSYS, Energy Plus and the like.

In order to execute those application programs, information on the facility to be given to the energy calculation unit 26 includes heat insulating performance, window area and floor area of the facility or each area 40, and the like. In addition, this sort of information includes power capacity of load apparatuses 30, efficiency information representing energy efficiency of the load apparatuses 30, illuminance set for lighting apparatuses 301, temperature set for air conditioners 302, temperature set for refrigerating apparatuses 303, operating time of the load apparatuses 30, and the like. The energy calculation unit 26 requires weather information such as outdoor temperature, humidity and quantity of solar radiation in a region where the management device 10 is installed.

The energy calculation unit 26 requires 200 to 300 kinds of parameters as information to be entered into the energy calculation unit 26 in order to use the application program for energy simulation. It is difficult to provide the energy calculation unit 26 with such a lot of information if it is set by neither expert nor specialist. Therefore, the remote management device 20 includes a parameter estimation unit 27 configured to automatically generate 200 to 300 kinds of parameters as information to be entered into the energy calculation unit 26 from only about 10 kinds of parameters as input information.

The parameter estimation unit 27 is configured to estimate information (parameters) to be entered into the energy calculation unit 26 based on information obtained from a user through communication of the remote management device 20 with the management device 10, and information set stored in the information storage unit 22. Information entered into the user device 60 associated with the management device 10 is stored in a holding unit provided in the information input unit 24. The information stored in the holding unit is information of basic conditions on the facility such as floor area, age of the facility, application of the facility (classifications of store, office and the like), region, business hours (usage time span), kinds of load apparatuses 30 and the like. Information to be entered into the parameter estimation unit 27 may be not only entered into the information input unit 24 from the load apparatus 60, but also directly entered into the information input unit 24.

On the other hand, the information to be extracted from the information storage unit 22 to be used by the parameter estimation unit 27 includes: power load density of load apparatuses 30 installed per area 40; grade of facility; energy efficiency of the load apparatuses 30; quantity of solar radiation, humidity, outdoor temperature, region in the presence of facility; and the like. The parameter estimation unit 27 further includes a function configured to estimate operating time of load apparatuses 30 from business start time. A data table or an arithmetic expression is used for estimating the operating time from the business start time.

Examples of operations for reducing electricity consumption in a facility based on the aforementioned management device 10, remote management device 20 and user device 60 is explained hereinafter.

Operation Example 1

An operation when the remote management device 20 generates contents of the control table 14, and an operation when the management device 10 controls load apparatuses 30 based on the control table 14 in order to attain the first power-saving ratio are explained hereinafter.

As stated above, in the remote management device 20, when information on a facility is given to the information input unit 24 from the management device 10, the comparison unit 23 extracts information corresponding to the information given to the information input unit 24 from the information storage unit 22. The data generation unit 25 generates contents of the control table 14 based on the information extracted from the information storage unit 22 by the comparison unit 23, and transmits the contents of the control table 14 to the renewal unit 15 of the management device 10. The renewal unit 15 puts the contents received from the data generation unit 25 on the control table 14.

As stated above, the information given to the information input unit 24 from the management device 10 includes equipment information, scene information and external environmental information, and identical or similar data with respect to these are extracted from the information storage unit 22. Therefore, based on those contents of the information, setting information is extracted. Since the extracted setting information is setting information which an expert or a specialist has set, the data generation unit 25 can comparatively easily and appropriately generate contents of the control table 14 based on the extracted setting information.

Thus, the data generation unit 25 can automatically generate the contents of the control table 14 based on the past setting information. In addition, the contents of the control table 14 can be also modified by a user by operating the user device 60.

FIG. 2 shows an example of the information set stored in the information storage unit 22. The figure shows an example of a food supermarket, and cases (refrigerating apparatuses 303) represent refrigerating showcases. In the example of the figure, ten items of {No, AREA, SCENE, Outdoor Temperature, Air Conditioning Capacity Basic Unit, Lighting Capacity Basic Unit, Case Capacity Basic Unit, Preset Temperature (Air Conditioning), Preset Illuminance, Preset Temperature (case)} constitute one record. The Air Conditioning Capacity Basic Unit is capacity basic unit of (an) air conditioners 302. The Lighting Capacity Basic Unit is capacity basic unit of (a) lighting apparatus 301. The Case Capacity Basic Unit is capacity basic unit of (a) refrigerating apparatuses 303. "AREA, Air Conditioning Capacity Basic Unit, Lighting Capacity Basic Unit, Case Capacity Basic Unit" correspond to the equipment information. "SCENE" corresponds to the scene information. "Outdoor Temperature" corresponds to the external environmental information. "Preset Temperature (Air Conditioning), Preset Illuminance, Preset Temperature (case)" correspond to the setting information. "No" is a number for record identification. Capacity basic unit of load apparatuses 30 is represented by power load density of which unit is W/m$^2$. Unit of preset temperature is degree Celsius, and unit of preset illuminance is 1×.

An expert or a specialist determines operations of load apparatuses 30 by estimating a margin allowing power-saving per area 40 in consideration of power load density. It is however difficult for a general user to determine operations of load apparatuses 30 in consideration of power load density. In the embodiment, the setting information stored in the information storage unit 22 has been employed by an expert or a specialist for a combination condition of the equipment information, the scene information and the external environmental information. Therefore, by using the information, the setting information can be set easily and appropriately.

In an example, the information input unit 24 receives information on selling area for area 40, busy time span for scene, 29° C. for outdoor temperature, 140 W/m$^2$ for air conditioning capacity basic unit, 26 W/m$^2$ for lighting capacity basic unit, and 200 W/m$^2$ for case capacity basic unit. In this example, the air conditioner(s) 302 is(are) to perform cooling operation. The comparison unit 23 tries record extraction from the information storage unit 22 based on {selling area, busy time span, 29, 140, 26, 200} as a key. As stated above, the comparison unit 23 generates data that coincide with conditions represented by characters and are similar to conditions represented by a numerical value for each of kinds of load apparatuses 30.

In the example of the figure, records of which "No" is "1" and "3" represent selling areas and busy time span. In this case, the comparison unit 23 narrows down records to be extracted to the two records. The comparison unit then determines setting information by evaluating similarity by using capacity basic unit and outdoor temperature and selecting setting information corresponding to higher similarity, for each of load apparatuses 30 based on the extracted records. At this time, each preset illuminance of lighting apparatuses 301 is not influenced by outdoor temperature. Each preset temperature of air conditioners 302 and refrigerating apparatuses 303 is influenced by outdoor temperature. Therefore, the similarity used to determine preset temperature is evaluated by further considering outdoor temperature.

In the aforementioned two records ("1" and "3"), respective capacity basic units of the lighting apparatuses 301 are 25 W/m$^2$ and 20 W/m$^2$, and 25 W/m$^2$ has higher similarity to the aforementioned lighting capacity basic unit of 26 W/m$^2$ designated from the information input unit 24. Therefore, 750 1× that is preset illuminance of record "1" is employed as preset illuminance. Capacity basic units of air conditioners 302 of records "1" and "3" are 100 W/m$^2$ and 150 W/m$^2$, respectively, and 150 W/m$^2$ has higher similarity to the aforementioned 140 W/m$^2$. Therefore, 26° C. that is preset temperature of record "3" is selected as setting temperature of an air conditioner(s) 302. Capacity basic units of refrigerating apparatuses 303 of records "1" and "3" are 200 W/m$^2$ and 250 W/m$^2$, respectively, and 200 W/m$^2$ of "1" has higher similarity to 200 W/m$^2$ from the information input unit 24. Therefore, 5° C. that is preset temperature of record "1" is selected as preset temperature of a refrigerating apparatus(es) 303. That is, in the example, the preset illuminance of the lighting apparatus(es) 301 is selected from a value corresponding to "1", the preset temperature of the air conditioner(s) 302 is selected from a value corresponding to "3", and the preset temperature of the refrigerating apparatus(es) 303 is selected from a value corresponding to "1". The outdoor temperature of record "1" is 28° C., and that of record "3" is 30° C., and 30° C. that is an unfavorable condition is employed. Therefore, the information on {selling area, busy time span, 30, 150, 25, 200, 26, 750, 5} is given to the data generation unit 25.

In a case where the comparison unit 23 evaluates the similarities and thereby two or more pieces of setting information including similarities which are slightly different from each other is extracted, an average value of respective setting information is employed. The information storage unit 22 may store each actual usage count of extracted records and the comparison unit 23 may employ, as setting information, an average value weighted by a corresponding actual usage count. That is, when extracting records from the information storage unit 22, the comparison unit 23 calculates a weighted average value of setting information by using a weighting factor based on actual usage counts of respective setting information extracted from the extracted records, where the weighting factor has a larger value as a corresponding actual usage count is larger. A weighted average value calculated like this is given to the data generation unit 25 as setting information. In a configuration in which user's usefulness is considered, if user name is included in each record stored in the information storage unit 22, records to be selected can be narrowed based on a key of user name.

In record extraction from the information storage unit 22 based on a key designated by the information input unit 24, there is a possibility that error information is included in a key by an input mistake or the like. If information is extracted from the information storage unit 22 based on such error information, appropriate setting information cannot be obtained. Therefore, desirably the information input unit 24 includes a function configured to previously check content of the key and disable the given information when the contents depart from a range of appropriate information. It is also desirable that if information to be stored in the information storage unit 22 is in inappropriate range as a result of judging whether or not it is in a range of appropriate information, the information be disabled.

In order to judge whether or not content of a key or information to be stored in the information storage unit 22 is appropriate, the numerical information (outdoor temperature and capacity basic unit) included in the environmental information may be set as a predictor variable, and a regression equation that setting information is set to objective variable may be produced for each of kinds of load apparatuses 30. In an example of using the regression equation, when a divergence degree between setting information estimated by the regression equation with respect to environmental information and setting information extracted by the comparison unit 23 departs from a permissible range, the information is disabled.

The information determined by the comparison unit 23 is provided to the data generation unit 25. The data generation unit 25 creates contents of the control table based on the information provided from the comparison unit 23. Thus, a new control table 14 is created based on the actual information created by an expert or a specialist in the past, and it is accordingly possible to obtain the control table 14 matching the control table created by an expert or a specialist.

As shown in FIG. 3, in the control table 14, each of control levels is related to information of operations of a lighting apparatus(es) 301, an air conditioner(s) 302 and a refrigerating apparatus(es) 303. In the embodiment, selection from four steps of control levels 0-3 is permitted. Control level 0 represents a control state that no energy-saving measure is performed. Control level 1 represents a control state of regular energy-saving. Control level 2 represents the strictest control state in a usually endurable range. Control level 3 represents a very strict control state unusually performed.

In other words, a control level means a control state that convenience by usage of load apparatuses 30 more decreases as its numerical value more increases. In an example of a food super market, the control level 0 is a normal operation mode and set for busy time span. The control level 1 is an operating mode for power-saving and is selected for off time span. The control 2 is selected for power-saving. The control 3 is so called a demand response, and selected when responding to a second power-saving ratio required from the electric public utility or the like. That is, the control level responds to setting condition by scene.

As stated above, if the contents of the control table 14 are determined, the management device 10 measures and monitors power consumption of the facility. The evaluation unit 12 provided in the management device 10 compares the electricity consumption (power consumption or energy consumption) measured with the measuring device 50 with the target value (target power or target energy) that is set to the target setting unit 11, and estimates whether or not a value of the electricity consumption is the target value or less at an end point of the judgment period based on a ratio of the electricity consumption to the target value. In other words, the management device 10 estimates whether or not the value of the electricity consumption exceeds the target value within the judgment period.

When estimating that the value of the electricity consumption exceeds the target value within the judgment period, the evaluation unit 12 provides the instruction unit 13 with an instruction for increasing the control level so that the power consumption by the load apparatuses 30 is reduced. For examples, the instruction is given at a point of time of the estimation. On the other hand, when estimating that the value of the electricity consumption at an end point of the judgment period is less than the target value and a difference between the target value and the electricity consumption is a specified value or more, the evaluation unit 12 provides the instruction unit 13 with an instruction for decreasing the control level so that convenience by usage of the load apparatuses 30 is improved.

The instruction unit 13 checks the control level with the control table 14 and instructs the load apparatuses 30 to be in operation state in response to the control level. In a case where a value of the electricity consumption still exceeds the target value within the judgment period even if the evaluation unit 12 selects the control level 3, a user is presented with contents, through the user device 60, which request the user to stop part of the load apparatuses 30. The contents presented through the user device 60 are read out from the presentation content storing unit 18, and output to the user device 60 through the presentation control unit 17. For example, warning contents of "For excess of demand soon, please stop operations of ambient load apparatuses" are employed as an output format to the user device 60, and to be displayed on the screen of the user device 60. Characters (icons) may be switched to be displayed on the screen of the user device 60 so that urgency is intuitively grasped in response to an employed control level.

Operation Example 2

A core explained in operation example 1 is a process that contents of the control table 14 are created based on the environmental information that is input by a user through the user device 60. In this operation, the contents of the control table 14 are created based on information extracted from the information storage unit 22 in accordance with the evaluation rule used by the comparison unit 23. However, the created contents are not verified.

Hereinafter, an operation that the energy calculation unit 26 receives the contents of the control table 14 created by the data generation unit 25 to perform energy simulation is explained. That is, the remote management device 20 provides the energy calculation unit 26 with the control data (the contents of the control table 14) created by the data generation unit 25 along with the environmental information of the facility. The environmental information entered into the energy calculation unit 26 includes information required for the energy simulation such as a classification of application of the facility, a classification of area 40, external environmental information, scene information, power load density and energy efficiency of load apparatuses 30. By the energy simulation, the energy calculation unit 26 calculates recommendation power that is minimum power not obstructing management of the facility.

The target evaluation unit 16 of the management device 10 compares the recommendation value (recommendation power or recommendation energy), which is a minimum electricity (power or energy) for realizing an environmental state for managing the facility without problems, with a target value (target power or target energy) determined by the reference value (reference power or reference energy) and the power-saving ratio. If the target value is smaller than the recommendation value, the target evaluation unit 16 judges that the requested power-saving ratio is difficult to achieve. The target evaluation unit then calls user's attention through the user device 60. When calling user's attention through the user device 60, the background screen of the user device 60 is changed from blue to red, or a beep sound is emitted from the user device 60, or a form of the icon displayed through the user device 60 is changed, for example.

An executable recommendation value (recommendation power or recommendation energy) is determined based on the regression equation that employs power load density and daily maximum temperature of outdoor temperature as predictor variables to calculate daily maximum power. The regression equation is obtained by extracting, from the information storage unit 22, information on facility of which configuration of application and load apparatuses 30 is similar to that of a facility in which load apparatuses 30 managed by the management device 10 are installed, and by using the extracted information. When actually obtaining the recommendation value (recommendation power or recommendation energy), a predicted maximum temperature on a predicted date in the facility in which the management device 10 is installed is applied to the regression equation, and thereby a maximum value of power load density is estimated. The maximum value of power load density is multiplied by floor area of the facility. This calculation result can be regarded as maximum power on the predicted date in the facility. From this value, the executable recommendation value can be therefore obtained. For example, the value is employed as executable recommendation power.

As stated above, by estimation based on energy simulation, the energy calculation unit 26 obtains the recommendation value (recommendation power or recommendation energy) which management of the facility is not influenced by. The target evaluation unit 16 compares a target value (target power or target energy) corresponding to the power-saving ratio that is set with the user device 60 and the recommendation value (recommendation power or recommendation energy), and evaluates feasibility of the target electricity. As stated above, if the target electricity is difficult to realize, the presentation control unit 17 calls user's attention through the user device 60. The user can accordingly set an appropriate power-saving ratio.

It is desirable that the user device 60 be configured to change screen display in response to a ratio of current power consumption (electricity consumption) to the target power (target value) as shown in FIG. 4 in order to provide the user with intuitive and intelligible information. For example, the user device 60 displays an icon 61 representing a face on the screen, and changes the icon 61 in response to the current electricity consumption (power consumption or energy consumption) with respect to the target value (target power or target energy). In this example, the icon 61 represents a smiling face if the electricity consumption (power consumption or the integrated value (energy consumption)) has a margin with respect to the target value (if 80% or less for example), and represents a tear-stained face if the electricity consumption exceeds a specified threshold (e.g., 90%) with respect to the target value. The target evaluation unit 16 judges the ratio of the current electricity consumption to the target value.

In an example, a straight line is set to have a slope determined by the target value (target power or target energy) and the judgement period, and approaching the target is shown if the electricity consumption (power consumption or energy consumption) is at a lower side of the straight line within the judgment period, while leaving the target is shown if the electricity consumption is at an upper side of the straight line within the judgment period. That is, by setting two regions, by the straight line, for judging transition of the electricity consumption to judgment periods, the display of the icon 61 may be changed in response to the electricity consumption existing in an upper region or a lower region with respect to the straight line.

Two or more straight lines may be set for judgment periods. As stated above, if one straight line is set, two states can be judged. In another example, by setting three straight lines with the target value (target power or target energy) that is set to 100%, four states can be judged, where the three straight lines are a straight line corresponding to 120% of the target value, a straight line corresponding to 80% of the target value, and a straight line corresponding to 100% of the target value. In short, two or more (e.g., four) icons different from each other may be related to two or more regions (e.g., four regions) divided by at least one (e.g., three) straight line(s), respectively. The icon 61 is not limited to facial expression. The icon may be appropriate image characters. The form of the icon 61 includes not only a shape but also a size and color.

There is a possibility that if a ratio of the electricity consumption (power consumption or energy consumption) to the target value (target power or target energy) exceeds the aforementioned threshold at a point of time that a period in time shorter than the judgement period elapses from a start point of the judgement period, the target value is exceeded at an end point of the judgement period. Accordingly, a user is notified that operations of appropriate load apparatuses 30 be limited. This notification may be performed by a message displayed on the screen of the user device 60 or output of a beep sound.

As explained above, a margin degree of the electricity consumption (power consumption or energy consumption) to the target value (target power or target energy) can be notified by changing the form of the icon 61. Accordingly, intuitive and intelligible notification can be provided for the user. In FIG. 4, a display section 62 for showing the power-saving ratio (20%) is provided at a lower part of the screen of the user device 60. The display section 62 shows a lower limit (recommendation value) of the power-saving ratio depicted by a broken-line rectangle, and an achieved power-saving ratio (20%) depicted by a solid line rectangle.

The management device 10 requires considering, with respect to the power-saving ratio employed thereby, power-saving ratio instructed from the remote management device 20. In the example of FIG. 4, the user device 60 shows, on the screen, information representing whether the current power-saving ratio is set by the management device 10 or the remote management device 20 ("SERVER" represents power-saving ratio from the remote management device 20).

In operation example 2, a person responsible for the facility is allowed to set the power-saving ratio with the user device 60. In addition, the operation states of load apparatuses 30 managed by the management device 10 are fed back in order to perform adjustment to the power-saving ratio instructed from the remote management device 20. A relation between the target value (target power or target energy) and electricity consumption (power consumption or energy consumption) is judged so that management of the facility is not influenced by the power-saving ratio that is set through the user device 60 by a user such as the person responsible for the facility. Such an operation is performed by the target evaluation unit 16. That is, the target evaluation unit 16 is configured to adjust the power-saving ratio so that the power-saving ratio that is set by a user and the power-saving ratio that is set from the remote management device 20 are balanced and power-saving in the facility coexists with the management.

Operation Example 3

As explained in the configuration of the management device 10, a first target value (first target power or first target energy) in accordance with the power-saving ratio instructed from the remote management device 20 is set to the target setting unit 11 of the management device 10. A second target value (second target power or second target energy) in accordance with the power-saving ratio that is set by a user such as a person responsible for the facility through the user device 60 is set to the target setting unit. Therefore, the first and second target values may mutually compete. In order to avoid the mutual competing, the target setting unit 11 includes the target selecting unit 114 configured to select one of the first and second target values. A procedure for selection of a target value (target power or target energy) in a case where the first and second target values compete mutually will be explained hereinafter.

In an example, a request for power-saving on the day and the next day is made by the electric public utility having the remote management device 20 or the like. In this case, the remote management device 20 provides a necessary management device 10 with a power-saving period (date and time) and a power-saving ratio. The management device 10 is configured, if receiving the power-saving ratio from the remote management device 20, to calculate a first target value (first target power or first target energy) based on the power-saving ratio to store the first target value and the power-saving period in the first setting unit 111.

On the other hand, if a power-saving period and a power-saving ratio are input by a user such as a person responsible for the facility through the user device 60, a second target value (second target power or second target energy) is calculated from the power-saving ratio. The second target value and the power-saving period are stored in the second setting unit 112.

The target setting unit 11 refers to current date and time measured by a timer unit (not shown) built in the management device 10 and operates load apparatuses 30 without power-saving if the current date and time is out of the power-saving period. If the current date and time is in the power-saving period, the target setting unit 11 also operates the load apparatuses 30 so that a first or second target value in respond to a corresponding power-saving period is satisfied.

If the power-saving period that is set to the first setting unit 111 overlaps with the power-saving period that is set to the second setting unit 112, the target selecting unit 114 employs a smaller target value of the first and second target values so that both target values (target power or target energy) are satisfied. In other words, the target selecting unit 114 employs a larger power-saving ratio.

The second power-saving ratio that is set with the user device 60 is considered to be smaller than the first power-saving ratio requested from the remote management device 20 in general. The management may be obstructed depending on kinds of load apparatuses 30 installed in the facility if the first power-saving ratio is employed. For example, a food supermarket requires maintaining electricity consumption (power consumption or energy consumption) of refrigerating apparatuses 303 that preserve food requiring refrigerating or freezing in order to prevent deterioration in the quality of food and troubles in the management.

Accordingly, if a small power-saving ratio is set on purpose through the user device 60 within the power-saving period during which the power-saving ratio requested from the remote management device 20 is employed, the target selecting unit 114 judges that there are troubles in the management, and preferentially employs the power-saving ratio that is set through the user device 60. For example, after power-saving is requested from the remote management device 20, if a power-saving ratio of 5% from a start point of a power-saving period is set through the user device 60 in order to decrease 15% before the start point of the power-saving period, the power-saving ratio becomes 5%. However, if a power-saving ratio that is set through the user device 60 is 0% before a start point of the power-saving period, the target selecting unit 114 judges that power-saving causes troubles in the management, and does not perform power-saving.

However, if the second power-saving ratio that is set through the user device 60 is always employed preferentially, the second power-saving ratio may be abused so that the first power-saving ratio that is set from the remote management device 20 is prevented from being employed. It is therefore desirable that a permission condition be provided in order that the second power-saving ratio that is set through the user device 60 be given precedence over the first power-saving ratio that is set from the remote management device 20.

For example, the permission condition requires that an integrated value of power consumption within the judgment period (usually 30 minutes) for determining a unit price of electricity charge is equal to or more than 90% of an upper limit that is set for the judgment period. This permission condition allows employing the second power-saving ratio in order to handle a case where demand power (demand) for the facility approaches the peak (upper limit). The permission condition may be a condition that a temperature inside of any of refrigerating apparatuses 303 be higher than a prescribed reference temperature. This permission condition may allow employing the second power-saving ratio in order to prevent deterioration in the quality of food owing to an increase in temperature within a refrigerating apparatus(es) 303. Thus, only when the permission condition is established, the second power-saving ratio is given precedence over the first power-saving ratio, and is employed. As a result, abuse of the second power-saving ratio can be prevented.

By the operation explained above, when a user such as a person responsible for the facility, handling the management at the facility judges that power-saving is difficult in view of the management of the facility to perform based on the power-saving ratio instructed from the remote management device 20, the power-saving ratio can be reduced. Moreover, abuse of the second power-saving ratio can be prevented because a certain restriction is added by the permission condition. Accordingly, when the first power-saving ratio is set from the remote management device 20 by demand of society, the second power-saving ratio that is set by the user is not employed if the permission condition is not established.

Operation Example 4

The remote management device 20 includes the energy calculation unit 26 configured to perform energy simulation based on computer simulation. In order to accurately perform energy simulation, it depends on a scale of the facility, but the energy calculation unit 26 requires information that includes 200 to 300 kinds of parameters. It is difficult for a general user such as an administrator of the facility to properly set the information as such many kinds of parameters according the facility. Energy simulation is difficult to perform unless an expert or a specialist performs.

In the embodiment, the parameter estimation unit 27 provided in the remote management device 20 is configured to generate, from input information that includes a few parameters, the information that includes a lot of parameters required for the calculation of the energy calculation unit 26. That is, even a user who is neither expert nor specialist can perform energy simulation only by giving input information including about ten parameters to the parameter estimation unit 27.

The input information given to the parameter estimation unit 27 is information, which a user can easily recognize, of environmental information on characteristics of the facility. The input information includes, as parameters, a floor area of the facility, age of the facility, application classification of the facility, a geographic region in which the facility exits, business hours of the facility, and kinds of load apparatuses 30 installed in the facility. The enumerated parameters of the input information are necessity minimum information and can be easily obtained by the user.

The parameter estimation unit 27 is configured, if receiving the input information, to refer to the information set that is a collection of various information stored in the information storage unit 22 to collect information required for the calculation by the energy calculation unit 26 from the information storage unit 22.

As stated above, the information set stored in the information storage unit 22 includes: power load density (or power capacity) of load apparatuses 30 installed per area 40; heat insulating performance or floor area of each area 40; energy efficiency per load apparatus 30; grade of the facility; energy efficiency of the load apparatuses 30; quantity of solar radiation, humidity, outdoor temperature, region in which the facility exits; and the like. The parameter estimation unit 27 includes a function configured to estimate operating time of the load apparatuses 30 from the business hours. An arithmetic expression or a data table stored in the information storage unit 22 is used for estimating the operating time from the business hours.

The information storage unit 22 may employ a size (a unit of length) with respect to a refrigerating apparatus(es) 303 in place of power capacity. A unit of length is commonly used for refrigerating apparatuses 303 in the industry. In addition, there is no direct relation between power capacity of refrigerating apparatus 303 and floor area of an area 40, and therefore the unit of length can provide higher estimation accuracy of power capacity than power load density. When using the unit of length for a refrigerating apparatus(es) 303, a user can roughly estimate the size(s) of the refrigerating apparatus(es) 303 installed in an area 40 from a space of the area 40.

That is, the parameter estimation unit 27 is configured, if receiving the aforementioned input information, to check the input information with the information set stored in the information storage unit 22 to evaluate similarity to the input information, thereby to estimate information to be given to the energy calculation unit 26. In other words, the parameter estimation unit 27 checks the input information including a few parameters with the information set including a lot of parameters stored in the information storage unit 22, thereby developing from the information including a few parameters into information including necessary many parameters required for energy simulation by the energy calculation unit 26.

The information storage unit 22 stores, as equipment information, the aforementioned information, as well as: standard information such as a ceiling height(s) and a window area ratio(s); standard information such as heat insulating performance of walls or windows per geographic region; and the like. Therefore, if the parameter estimation unit 27 receives, as parameters of the input information, floor area of the facility, age of the facility, application classification of the facility, and geographic region in which the facility exits, it can obtain information such as heat insulating performance, a window area(s) and a ceiling height(s) of facility required for the energy simulation.

The information storage unit 22 stores external environmental information such as outdoor temperature, humidity, quantity of solar radiation and the like, which is classified per region. The parameter estimation unit 27 is configured, if receiving input information including a region where the facility exists, to output external environmental information.

The information storage unit 22 stores equipment information, scene information and external environmental information, as well as setting information on load apparatuses 30. Therefore, setting information on load apparatuses 30 corresponding to the facility can be extracted by searching equipment information, scene information and external environmental information by using input information of the parameter estimation unit 27 as a key.

When extracting two or more pieces of information from the information storage unit 22 based on the input information, the parameter estimation unit 27 performs information narrowing by a majority rule if the extracted information is non-numeral information, and calculate an average value(s) if it is numeral information. Operating time of load apparatuses 30 is extracted from the information storage unit 22 based on business hours of the facility. The information storage unit 22 stores a reference value with respect to the operating time of load apparatuses 30 and correction values in response to business hours. The parameter estimation unit 27 is configured, if receiving business hours of the facility as input information, to calculate operating time of load apparatuses 30 per area 40, in response to business hours.

For example, in a store of which business hours are from eight a.m. to ten p.m., 1 to 2 hours before the business hours are preparation time before opening the store, and 1 to 2 hours after the business hours are cleaning up time after closing the store. In this example, if lighting apparatuses 301 are lit so as to secure illuminance required for working with air conditioners 302 stopped for the preparation time, operating time of the air conditioners 302 coincides with business hours. However, the lighting apparatuses 301 requires operating for 1 to 2 hours required for working that is out of business hours. The refrigerating apparatuses 303 require continuously operating regardless of the business hours except for lighting inside the refrigerating apparatuses while products are stored in the refrigerating apparatuses.

On the other hand, in a store of 24-hour operation, preparation such as product supplement and cleaning is performed in the night in which a few customers are (from 0 a.m. to 5 a.m.) regardless of business hours before time span in which customers increase. Therefore, lighting apparatuses 301 and air conditioners 302 are continuously operated without stopping.

Accordingly, in case of stores that is not 24-hour operation, if the information storage unit 22 stores correction values in response to business hours, the parameter estimation unit 27 can estimate operating time of load apparatuses 30 in response to the business hours of the facility.

The information storage unit 22 stores energy efficiency (apparatus efficiency) for each of the kinds of the load apparatuses 30. The energy efficiency is represented by a relation between outdoor temperature and apparatus efficiency (COP: Coefficient Of Performance) in a case of air conditioners 302 for example. Therefore, the parameter estimation unit 27 estimates external environmental information from the region of the facility, and then estimates apparatus efficiency based on the outdoor temperature included in the external environmental information.

The parameter estimation unit 27 estimates information required for energy simulation by the energy calculation unit 26 based on the input information. Therefore, if the amount of the input information is increased, estimation accuracy of the information given to the energy calculation unit 26 can be enhanced. It is therefore possible for an expert or a specialist having knowledge about energy simulation to directly input information including a lot of parameters to the energy calculation unit 26 in order to enhance accuracy of the energy simulation. The energy calculation unit 26 accordingly allows an expert, a specialist or the like to directly input information including a lot of parameters to. That is, the energy calculation unit 26 is configured, if receiving input information including all parameters included in the facility information from the information input unit 24, to calculate a recommendation value (recommendation power or recommendation energy) without using parameters generated by the parameter estimation unit 27. The energy calculation unit 26 may calculate a reference value (reference power or reference energy) along with the recommendation value.

If an expert or a specialist directly inputs information including a lot of parameters to the energy calculation unit 26, contents of the information storage unit 22 can be renewed. For example, if 150 kW is directly input, as power capacity of an air conditioner(s) 302 installed in a selling area of which floor area is 1000 m², to the energy calculation unit 26, the air conditioning capacity basic unit is 150 W/m². The value thus obtained is stored in the information storage unit 22. That is, information directly input to the energy calculation unit 26 by an expert or a specialist is stored in the information storage unit 22 and used for subsequent estimation by the parameter estimation unit 22. Therefore, new information is added to the information set stored in the information storage unit 22 at all times. In this example, if old information before a prescribed period with respect to the added information is deleted from the information storage unit 22, the information set stored in the information storage unit 22 can be prevented from becoming obsolete.

If the parameter estimation unit 27 generates information to be used for the energy simulation based on the input information, the energy calculation unit 26 performs the energy simulation based on object and effect of the energy-saving as restriction conditions. By this simulation, the energy calculation unit 26 calculates target electricity (target power or target energy) with respect to the facility designated by the input information.

As stated above, the embodiment includes the instruction unit 13, the user device 60, the target evaluation unit 16 and the presentation control unit 17. The instruction unit 13 is configured, in accordance with a power-saving ratio as a target in the facility in which load apparatuses 30 are installed, to control operations of the load apparatuses 30. The user device 60 has a function (the display unit) configured to display information. The target evaluation unit 16 is configured evaluate consumption of utility energy by the load apparatuses 30 with respect to a predetermined target value. The presentation control unit 17 is configured to control so that the user device 60 displays an icon of which form is varied according to an evaluation result by the target evaluation unit 16. In this embodiment, even a user without having expert knowledge can manage a target value on consumption of utility energy.

The invention claimed is:

1. An energy management system, comprising:
  at least one processor; and
  at least one memory communicatively coupled to the at least one processor;
  wherein the processor is configured to:
    control operations of load apparatuses in accordance with a power-saving ratio as a target in a facility where the load apparatuses are installed;
    evaluate consumption of utility energy by the load apparatuses with respect to a predetermined target value, based on the power-saving ratio, to produce an evaluation result;
    control so that a user device displays an icon of which form varies according to the evaluation result,
    set, to a recommendation value, minimum consumption of utility energy by which management of the facility is not influenced;
    store in the at least one memory capacity basic units obtained by dividing consumption of utility energy of load apparatuses obtained from each of facilities by a floor area of a corresponding facility;
    calculate the recommendation value of the facility by energy simulation; and
    generate first information required for calculating the recommendation value of the facility, wherein
  the later controlling includes controlling, when the target value is set to be lower than the recommendation value, to control so that the user device displays a message representing that the target value is unattainable,
  the calculating includes multiplying the floor area of the facility of the recommendation value to be calculated by the capacity basic unit stored in the at least one memory and thereby to calculate the consumption of utility energy by the load apparatuses in the facility of the recommendation value to be calculated, and
  the generating includes generating, from second information that includes a first number of parameters, the first information that includes a second number of parameters required for the calculation of the recommendation value of the facility, wherein the second number is larger than the first number.

2. The energy management system of claim 1, wherein
  the evaluating includes setting, based on the target value that is set at an end point of a prescribed judgement period, regions for determination of a transition in the consumption during the judgement period, and
  the later controlling includes varying the form of the icon according to a region to which the consumption belongs.

3. The energy management system of claim 1, wherein
  the evaluating includes determining a ratio of the consumption to the target value, and
  the later controlling includes controlling, if the ratio of the consumption to the target value exceeds a specified threshold, so that the user device displays a message for causing part of the load apparatuses to be stopped.

4. The energy management system of claim 1, wherein
  the storing includes storing information on weather information including an outdoor temperature and a region in which the facility exists, which are related to each other,
  the calculating includes
    setting, as predictor variables, a daily maximum temperature of an outdoor temperature extracted from the storing step according to a region of the facility of the recommendation value to be calculated and the capacity basic unit extracted from the storing step with respect to the load apparatuses in the facility, and
    calculating a maximum value as the recommendation value by using a regression equation for calculating a daily maximum value of consumption of utility energy.

5. The energy management system of claim 2, wherein
  the evaluating includes determining a ratio of the consumption to the target value, and
  the later controlling includes controlling, if the ratio of the consumption to the target value exceeds a specified threshold, so that the user device displays a message for causing part of the load apparatuses to be stopped.

6. The energy management system of claim 1, wherein the later controlling includes controlling so that the user device displays a current power saving ratio and a lower limit of the power saving ratio.

* * * * *